US008332348B1

(12) United States Patent
Avery

(10) Patent No.: US 8,332,348 B1
(45) Date of Patent: Dec. 11, 2012

(54) KNOWLEDGE EXTRACTION AND PREDICTION

(75) Inventor: Larry Avery, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 713 days.

(21) Appl. No.: 12/500,702

(22) Filed: Jul. 10, 2009

(51) Int. Cl.
  *G06F 15/18* (2006.01)
  *G06F 17/00* (2006.01)
  *G06N 5/04* (2006.01)
(52) U.S. Cl. .......................................................... 706/61
(58) Field of Classification Search ........................ None
  See application file for complete search history.

(56) References Cited

U.S. PATENT DOCUMENTS

| | | | |
|---|---|---|---|
| 4,591,983 A | 5/1986 | Bennett et al. | |
| 4,593,367 A | 6/1986 | Slack et al. | |
| 4,670,848 A | 6/1987 | Schramm | |
| 4,777,585 A | 10/1988 | Kokawa et al. | |
| 4,805,225 A | 2/1989 | Clark | |
| 4,815,005 A | 3/1989 | Oyanagi et al. | |
| 4,849,905 A | 7/1989 | Loeb et al. | |
| 4,908,778 A | 3/1990 | Moriyasu et al. | |
| 4,930,071 A | 5/1990 | Tou et al. | |
| 5,113,483 A | 5/1992 | Keeler et al. | |
| 5,379,419 A | 1/1995 | Heffernan et al. | |
| 5,394,512 A | 2/1995 | Kishi et al. | |
| 5,600,831 A | 2/1997 | Levy et al. | |
| 5,809,296 A | 9/1998 | Yong et al. | |
| 5,848,402 A | 12/1998 | Pao et al. | |
| 6,182,062 B1 | 1/2001 | Fujisawa et al. | |
| 6,385,454 B1 | 5/2002 | Bahl et al. | |
| 6,865,582 B2 | 3/2005 | Obradovic et al. | |
| 7,313,279 B2 | 12/2007 | Duan et al. | |
| 7,455,226 B1 * | 11/2008 | Hammond et al. | 235/385 |
| 2006/0212386 A1 * | 9/2006 | Willey et al. | 705/38 |
| 2008/0222065 A1 * | 9/2008 | Kedrowski et al. | 706/19 |

OTHER PUBLICATIONS

Hawkins, Jeff, et al. "On Intelligence", 1st Edition, 2004, pp. 106-176, 208-210, 221-222, and 235.

* cited by examiner

*Primary Examiner* — Omar Fernandez Rivas
*Assistant Examiner* — Luis Sitiriche
(74) *Attorney, Agent, or Firm* — Brooks, Cameron & Huebsch, PLLC

(57) ABSTRACT

Methods and systems for knowledge extraction and prediction are described. In an example, a computerized method, and system for performing the method, can include receiving historical data pertaining to a domain of interest, receiving predetermined heuristics design data associated with the domain of interest, and using the predetermined heuristics design and historical data, automatically creating causal maps including a hierarchy of nodes, each node of the hierarchy of nodes being associated with a plurality of quantization points and reference temporal patterns, the plurality quantization points being known reference spatial patterns. In an example the computerized method, and system for performing the method, can further include receiving, at each node, a plurality of unknown patterns pertaining to a cause associated with the domain of interest, automatically mapping the plurality of unknown patterns to the quantization points using spatial similarities of the unknown patterns and the quantization points, automatically pooling the quantization points into a temporal pattern, the temporal pattern being a sequence of spatial patterns that represent the cause, automatically mapping the temporal pattern to a reference temporal pattern, automatically creating a sequence of the temporal patterns, and automatically recognizing the cause using the sequence of temporal patterns.

29 Claims, 10 Drawing Sheets

KNOWLEDGE EXTRACTION AND PREDICTION

FIELD

This application relates to methods and systems for knowledge extraction and prediction, for example, for the extraction of data related to financial transactions and early detection of fraud.

BACKGROUND

Today organizations, their employees, and business systems are overwhelmed by the challenge of extracting and applying knowledge from an ever-increasing volume of raw data. Current solutions such as data mining and reasoning engines are not scalable, are expensive to license and maintain, and have limited reuse value.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In an example, a computerized method, and system for performing the method, can include receiving historical data pertaining to a domain of interest, receiving predetermined heuristics design data associated with the domain of interest, and, using or based on the predetermined heuristics design and historical data, automatically creating causal maps including a hierarchy of nodes, each node of the hierarchy of nodes being associated with a plurality of quantization points and reference temporal patterns, the plurality quantization points being known reference spatial patterns. In an example, the computerized method, and system for performing the method, can include receiving, at each node, a plurality of unknown patterns pertaining to a cause associated with the domain of interest, automatically mapping the plurality of unknown patterns to the quantization points using spatial similarities of the unknown patterns and the quantization points, automatically pooling the quantization points into a temporal pattern, the temporal pattern being a sequence of spatial patterns that represent the cause, automatically mapping the temporal pattern to a reference temporal patterns, automatically creating a sequence of the temporal patterns, and automatically recognizing the cause using the sequence of temporal patterns.

In an example, a computerized method, and system for performing the method, can include receiving via data sensors the plurality of unknown patterns pertaining to the cause associated with the domain of interest. In an example, a computerized method, and system for performing the method, can include automatically making a trend prediction using on the sequence of temporal patterns. In an example, a computerized method, and system for performing the method, can include effecting a change in the domain of interest using the cause recognition.

In an example, a computerized method, and system for performing the method, can include one or more of the following domains of interest: fraud, stocks, member experience, and enterprise network. In an example, a computerized method, and system for performing the method, can include predetermining the number of quantization points and reference temporal patterns. In an example, a computerized method, and system for performing the method, can include automatically optimizing the predetermined heuristics data using evolutionary algorithms. In an example, a computerized method, and system for performing the method, can include providing the heuristics designed data in one or more configuration files.

In an example, a computerized method, and system for performing the method, can include automatically arranging the causal maps according to a bureaucracy design pattern. In an example, a computerized method, and system for performing the method, can include creating the causal maps and recognizing the cause substantially simultaneously. In an example, a computerized method, and system for performing the method, can include mapping of the plurality of unknown patterns to the quantization points and mapping the temporal pattern to the reference temporal patterns by automatically calculating Euclidean distances to determine how close they are to each other spatially.

In further examples, the above methods steps are stored on a machine-readable medium comprising instructions, which when implemented by one or more processors perform the steps. In yet further examples, subsystems or devices can be adapted to perform the recited steps. Other features, examples, and embodiments are described below.

BRIEF DESCRIPTION OF DRAWINGS

Embodiments are illustrated by way of example and not limitation in the figures of the accompanying drawings, in which like references indicate similar elements and in which.

DETAILED DESCRIPTION

Methods and systems for knowledge extraction and prediction enable the extracting of knowledge from raw data generated by various computer-implemented processes as well as making automatic predictions related to these processes. To implement methods and systems for knowledge extraction and prediction, a knowledge extraction and prediction engine can be built. The knowledge extraction and prediction engine can include hierarchically composed patterns of nodes. The architecture of the particular knowledge extraction and prediction engine can use or be determined from historic data pertaining to the domain of interest as well as use or be determined from predetermined heuristics. Before knowledge can be extracted and a prediction made, a hierarchy of nodes is built and each node can be trained by being assigned reference spatial and temporal patterns using the historic data.

Knowledge can be extracted from the data pertaining to the domain of interest by using sensors to supply reference data containing patterns associated with the domain of interest. The patterns can be recognized by comparing the patterns to the reference spatial and temporal patterns. Based on these recognitions, trained knowledge extraction and prediction engine can make immediate and/or trending predictions. Given an appropriate node structure, algorithm choices and parameters, problem description, and training configurations, the knowledge extraction and prediction engine can be generated for many domains. The heuristics of a particular knowledge and extraction engine can be separately predetermined for each domain and purpose. In some example embodiments, the knowledge and extraction engine can operate simultaneously in both the training and reference modes.

The bureaucracy design pattern can be utilized to optimize the heuristics utilized by a particular knowledge and extraction engine. The knowledge extraction and prediction engine can also utilize principles of complex adaptive systems to optimize its performance.

Example methods and systems for knowledge extraction and prediction are described. In the following description, for purposes of explanation, numerous specific details are set forth in order to provide a thorough understanding of example embodiments. It will be evident, however, to one skilled in the art that the present invention may be practiced without these specific details.

Figure 1:
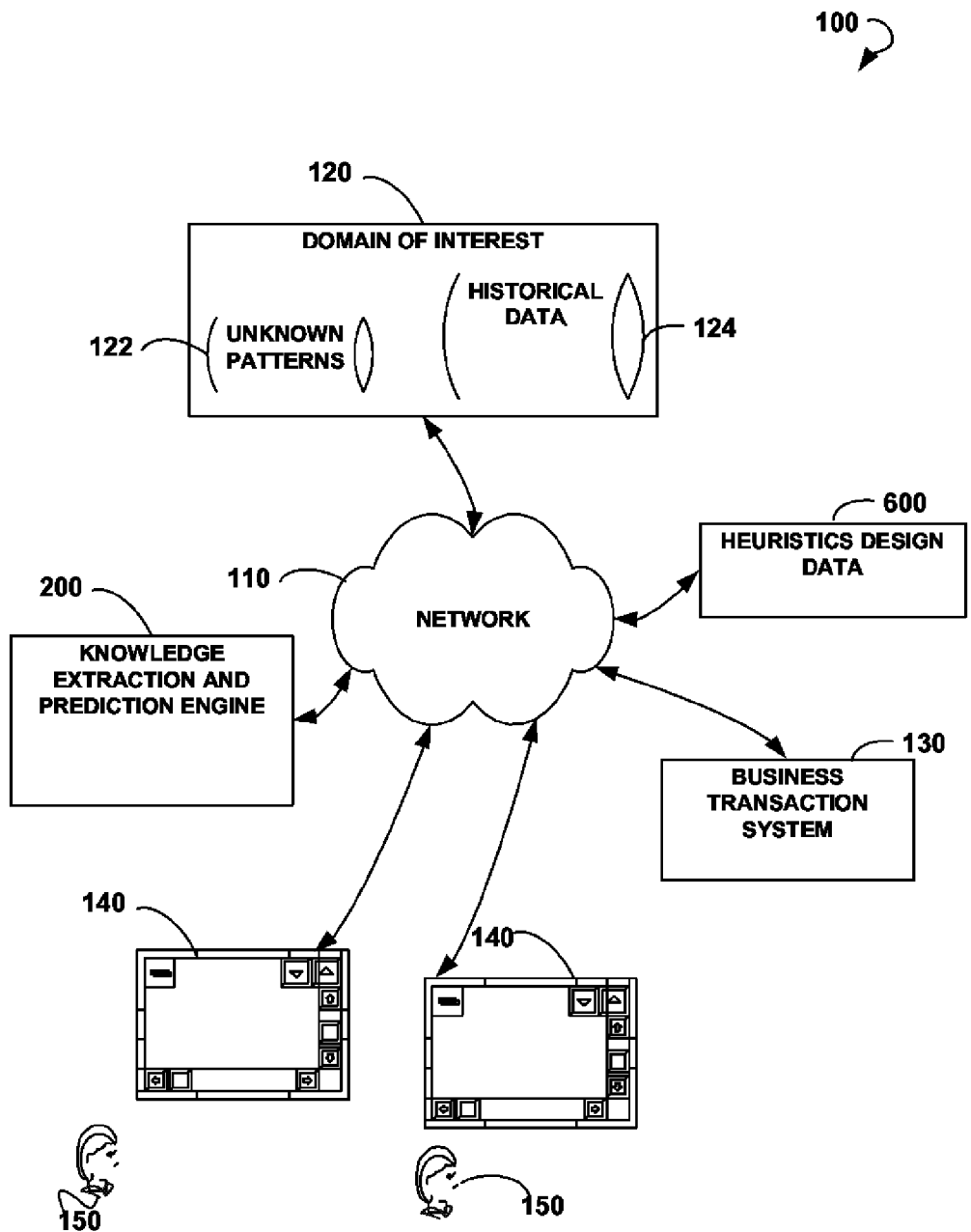
FIG. 1 is a schematic diagram showing an environment within which systems and methods are implemented according an example embodiment.

FIG. 1 illustrates an example environment 100, within which asset information reporting can be implemented. As shown in FIG. 1, the example environment 100 can include a network 110, a domain of interest 120, a business transaction system 130, user interfaces 140, users 150, a knowledge extraction and prediction engine 200, and a heuristics design data 600.

The network 110 is preferably the Internet, but any network capable of communicating data between devices can be used with the present system. In addition to the Internet, suitable networks can also include or interface with any one or more of the systems. For instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection may be used as interface devices. Other example networks include an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications can also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital, or analog interface or connection, mesh or Digi® networking.

The domain of interest 120 can include, for example, an area of the financial institution related to fraud, stocks, member experience, and enterprise network. The domain of interest 120 can include the unknown patterns 122 and the historical data 124.

The unknown patterns 122 are the patterns to be recognized and acted upon once the system for knowledge extraction and prediction is trained. The unknown patterns 122 can be generated by current transactions within the domain of interest 120. The historical data 124 can be generated by past transactions within the domain of interest 120. The historical data 124 can be limited according to certain predetermined criteria. For example, only six month of the historical data 124 to date can be utilized.

Within the context of a financial institution, the historical data 124 can represent member's interaction with channels and the outcomes associated with those interactions, data from multiple monetary transactional feeds from various sources used for fraud detection or otherwise, system logging data, system data related to the "timing/timeout" aspects (e.g. HTTP Session, Database Session, and TCP/IP Sockets), data related to member's current holdings and status of those holdings, and generally any piece of information that contains extractable knowledge.

The business transaction system 130 can represent a transaction system utilized by an organization such as a financial institution, to process various business-related transactions. In some example embodiments, a system for knowledge extraction and detection can be embedded in the business transaction system 130. For example, to understand fraud in the credit card business, the business transaction system 130 permits plugging in a system for knowledge extraction and detection to detect fraud. The system for knowledge extraction and detection can be trained to detect fraud based on the historical patterns resulting in the high likelihood of fraud.

The knowledge extraction and prediction engine 200 can be utilized for knowledge extraction and prediction of general purpose and can be reused for various applications. Methods and systems for knowledge extraction and prediction can be applicable to relationships and patterns, which can be too complex or contain too many variables or have the pattern too dispersed for humans to understand. There are spatial and temporal relationships of these patterns, which are discussed in more detail below.

The heuristics design data 600 can be utilized to build an optimal system for knowledge extraction and detection given a particular problem. The heuristics design data 600 can specify the number of levels in the hierarchy, number of nodes, and other architectural specifics. The heuristics design data 600 can be based on an assumption that the particular problem has spatial and temporal characteristics. Therefore, the problem is to be presented as having causes that change over time. When, for example, the domain of interest 120 is related to stocks, the heuristics design data 600 can specify that the first level of the node hierarchy represent various technologies. The next level up can specify technology groups. The top level can represent daily or seasonal trends. The heuristics design data 600 can be automatically optimized using evolutionary algorithms.

Figure 2:
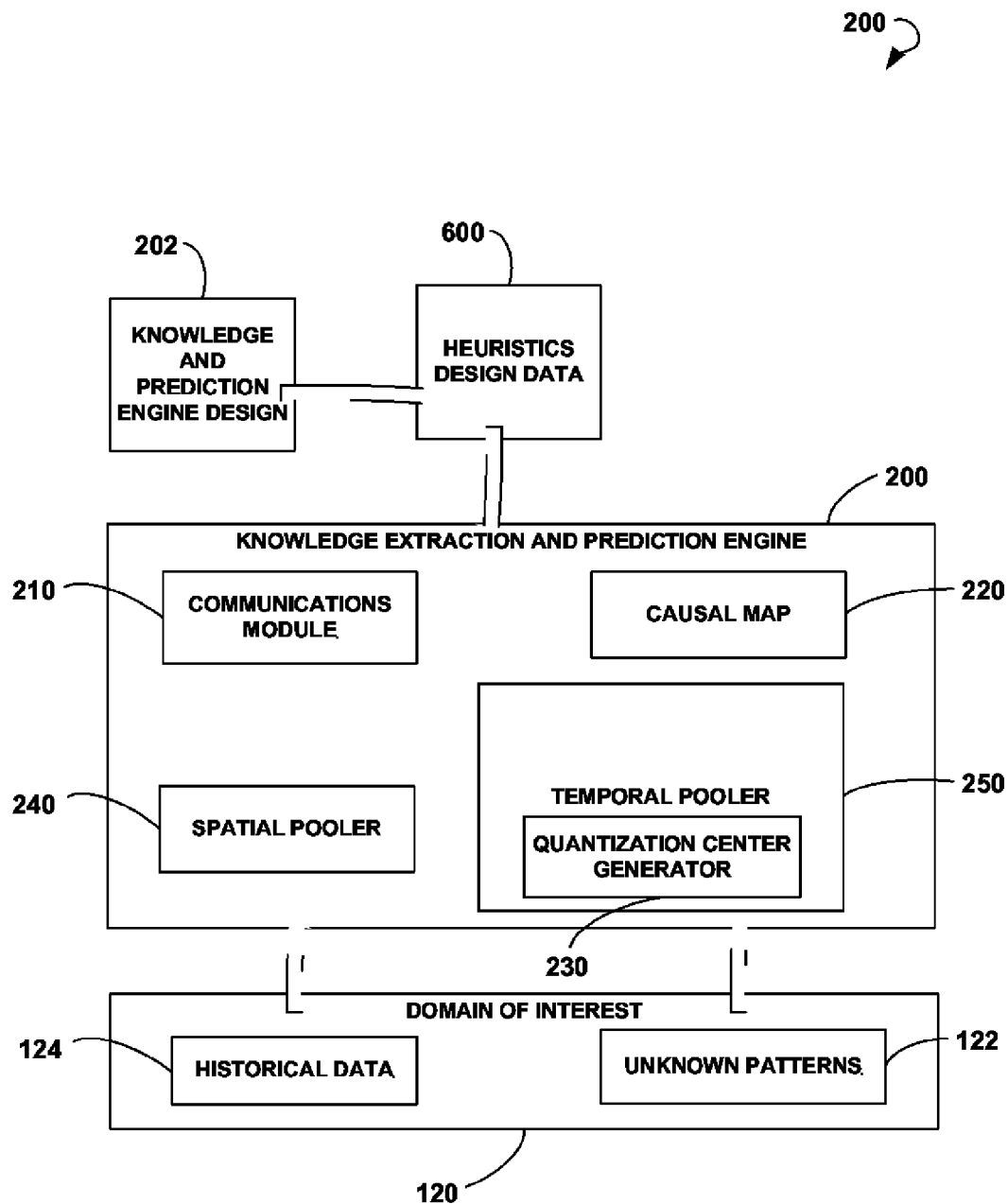
FIG. 2 is a schematic diagram of a system according to an example embodiment.

FIG. 2 illustrates a schematic diagram of a system 200 according to an example embodiment. The system 100 can include the domain of interest 120, the knowledge extraction and prediction engine 200, and the heuristics design data 600. The knowledge extraction and prediction engine 200 can include a communication module 210, a causal map 220, a spatial pooler 240, and a temporal pooler 250, which can include a quantization center generator 230.

The extraction and prediction engine 200 can be structured as a hierarchical, memory-based, learning and prediction network. The network can include software instructions stored in a computer readable medium. Such software instructions can be executed on a computing machine that is transformed by the software instructions into a specific, particular machine that is dedicated to the particular task. The extraction and prediction engine 200 can learn by creating causal maps as perceived by incoming sensor-based data. According to an example embodiment described herein, all nodes in the extraction and prediction engine 200 can execute the same algorithm. Each node can learn two types of patterns when building causal maps. First, each node can learn spatial patterns or objects that are similar; a bowl in motion or a financial transaction, for example. Second, each node can learn temporal patterns that are sequences of spatial patterns. Because the nodes are structured hierarchically, the patterns continually compose themselves such that by the time the top level of the hierarchy is reached, the patterns can be transformed into stable-long-duration trends. Thus, for example, building block single stock patterns at the bottom of the hierarchy can turn into market trends at the top.

This kind of hierarchy represents the theory related to the technology disclosed herein. Recognized patterns can be used to predict the next part of a pattern sequence given the first part as data moves down the hierarchy. Finally, given the hierarchical structure, the extraction and prediction engine 200 can automatically creates patterns composed of patterns that are composed of patterns. For example, instead of seeing patterns of a specific stock, patterns of categories of stocks can be seen or seasonal weather patterns instead of today's weather.

For the purposes of this disclosure, the following definitions are set forth. A Hierarchical Temporal Memory (HTM) is a machine-learning model. In an example HTM is described in the book entitled "On Intelligence" written by Jeff Hawkins and published by Times Books in 2004, the disclosure of which book is hereby incorporated by reference in its entirety. However, if there is a disagreement between the disclosure incorporated by reference and the present specification, the present specification controls. A cause is a persistent structure that exists over time (e.g. person, car, song, ideas, and word). A spatial pattern is a pattern maintained by a node as a quantization point. A temporal pattern is a sequence of spatial patterns that represent a cause.

The quantization point is a spatial pattern identified by an HTM node during training Pooling is the process of assigning multiple patterns to one label that is putting the patterns in the same pool. There are two pooling mechanisms used by a node. Spatial Pooling is the first of two node-pooling mechanisms based on spatial similarity where a node takes an unknown pattern and determines how close it is to each quantization point (current set of learned spatial patterns). Temporal pooling is the second of the two node pooling mechanisms where a node maps many quantization points (spatial patterns) to a single sequence. The temporal pooling mechanism can be more powerful because it allows arbitrary mappings of different input patterns that have no spatial overlap.

The following example illustrates how suspicious activities can be detected using an example knowledge extraction and prediction method. According to the example, network nodes at the lowest level can build causal maps that recognize patterns at fundamental levels of abstraction from the volume of information presented to them via sensors. The method may commence with receiving of the unknown pattern 122 from the domain of interest 120.

Upon receiving the unknown pattern 122, the extraction and prediction engine 200 can determine that the unknown pattern 122 is followed by other specific patterns in a certain order. Based on the historical data 124, the extraction and prediction engine 200 can determine that such an arrangement indicates, with 75% probability that a specific pattern will occur next. Based on the historic data 124, it can indicate the likelihood of suspicious activity occurring with 92% probability. Finally, at the higher levels of the network within the extraction and prediction engine 200, various specific predictions can be aggregated to predict a trend. In the training phase, explanation of sequence of failures can be associated (learned) with this trend with recommendations on most likely causes and how to resolve them.

The communication module 210 of the extraction and prediction engine 200 can be utilized to receive the heuristics design data 600 and the historical data 124. In another example, the communication module 210 can communicate the data related to the bureaucracy design pattern 202 as well as to communicate with the complex adaptive system 202. The causal map architecture generator 220 can generate the causal maps including a hierarchy of nodes. The quantity of the quantization points can be predetermined. The spatial pooler 240 can be utilized to pool spatial patterns that are found to be spatially similar together. The temporal pooler 250 can pool groups of spatial patterns together based on their temporal relationships.

The heuristics design data 600 provides data to the knowledge extraction and prediction engine 200 in the form of predetermined configuration files. The configuration files can include, for example, parameters specifying how many nodes, and which algorithm can be utilized within the knowledge extraction and prediction engine 200. The training can be performed automatically using another configuration file provided by the heuristics design data 600. Yet another configuration file provided by the heuristics design data 600 can enable testing of the knowledge extraction and prediction engine 200.

Thus, the resulting knowledge extraction and prediction engine 200 can be customizable at creation, training, and deploy time. The usage of the bureaucracy design pattern 202 can enhance the dynamicity of this customizability. An additional network configuration, based on the bureaucracy design pattern 202, can provide additional benefit by having the knowledge extraction and prediction engine 200 manage its own hierarchy. The bureaucracy design pattern 202 can assign various roles to the nodes. Some of the nodes can be assigned a manager role while others can be assigned a subordinate role. When a manager observes changes to its subordinate node (e.g. a pattern recognized, a novel input, a frequency of novel input changing, a frequency of patterns recognized, and a novel input changing), it can react by optimizing the customizable settings at runtime.

The complex adaptive system 204 can help to determine how to optimize the hierarchy of nodes, how many levels of the hierarchy need to be created, with how many nodes on each level. The complex adaptive system 204 can further determine what multiple algorithms and multiple parameters for each algorithm has to be utilized. This approach will permit optimizing the knowledge extraction and prediction engine 200 automatically without spending time trying to determine all these parameters manually. The complex adaptive system 204 can permit coming to a solution that is closer to the optimal solution. The heuristics design data 600 provides information utilized in the construction of the knowledge extraction and prediction engine 200. In an example, the heuristics design data, optimized by genetic algorithms, can help determine the hierarchy of nodes including how many levels of the hierarchy need to be created with how many nodes on each level, which algorithms and associated parameters to specify. This approach will permit optimizing the knowledge extraction and prediction engine 200 automatically without spending time trying to determine all these parameters manually. The heuristics design data 600 provides information utilized in the construction of the knowledge extraction and prediction engine 200.

Figure 3:
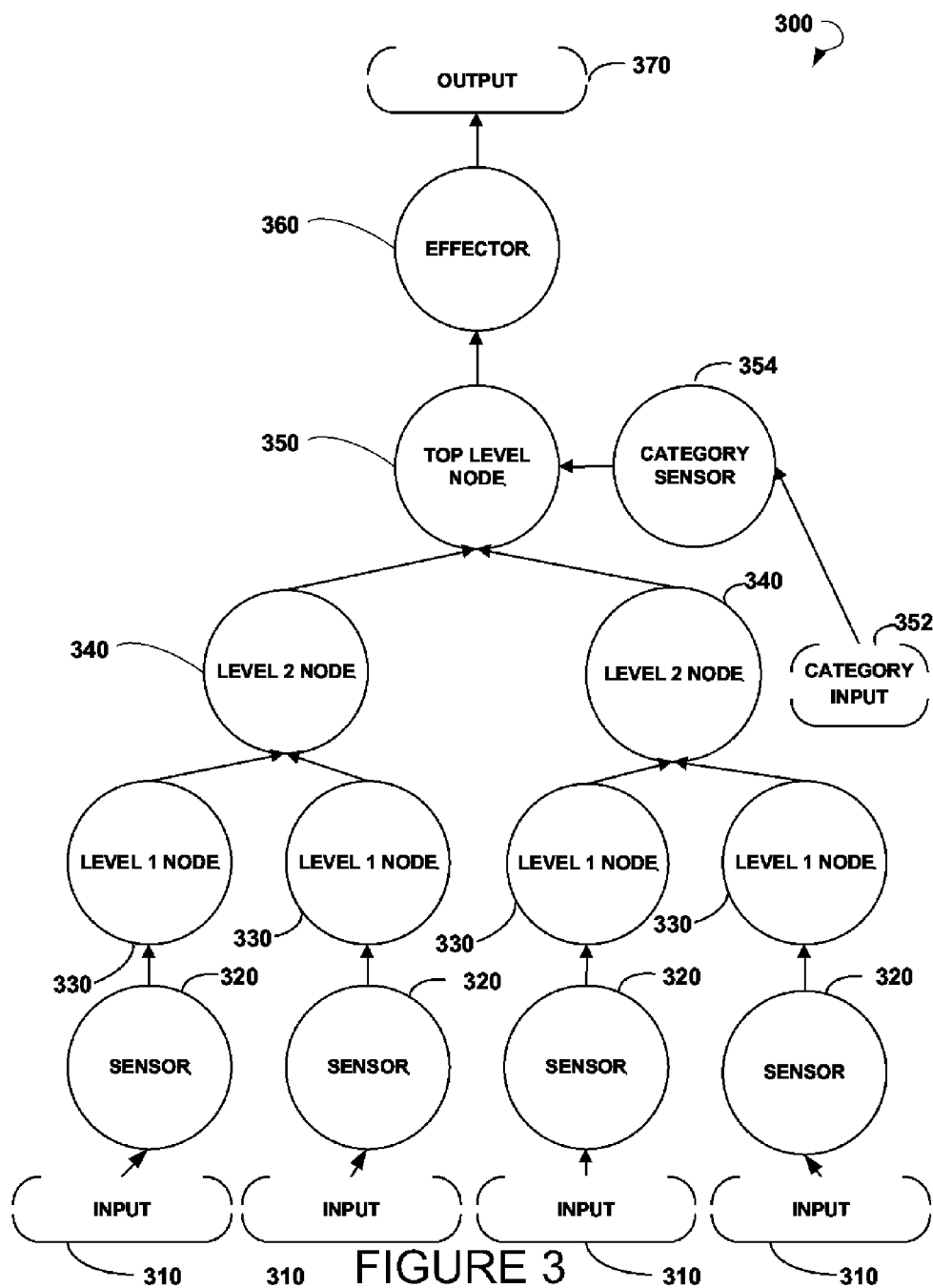
FIG. 3 is a schematic diagram of a node hierarchy according to an example embodiment.

FIG. 3 illustrates a schematic diagram of a node hierarchy 300 according to an example embodiment. The node hierarchy 300 can include an inputs 310, sensors 320, level 1 nodes 330, level 2 nodes 340, a top node 350, a category input 352, a category sensor 354, an effector 360, and a output 370.

Sensors 320 can sense real world events and convert them into electronic, e.g., digital, representations. Sensors 320 that receives the unknown patterns 122 from the domain of interest 120. Sensory data from sensors 320 is converted to a form suitable for consumption by the level one nodes 330 to which the sensors 320 are connected. The inputs 310 can provide, for example, temperature, pressure, moisture, electrical activity, physical, and light measurements. Each level one node of the node hierarchy 300 one measurement, which can be spatially recognized, then temporally grouped spatial (e.g., two temperatures are proximate) and temporal (e.g., temperature is rising). The temporal reading can be passed up to the level two nodes and then to the top node 350 in this example. At the top node 350, it can be determined that the temperature has been increasing, pressure is dropping, it is getting darker and the amount of moisture in the air is rising (temporal reading of the level one node). This may indicate that an event (e.g., a storm) is approaching. No decision is made at the node; the information is passed up along with probability vectors until the information reaches the top node 350.

The knowledge extraction and prediction engine 200 can have sensory input with two characteristics. First, the sensory data can measure something that is directly or indirectly impacted by the causes in the world that one might be interested in. Second, the sensory data must change and flow continuously through time, while the causes underlying the sensory data remain relatively stable. The end goal of the knowledge extraction and prediction engine 200 learning process is the development of internal representations of the causes in the world. Given a novel sensory input, the knowledge extraction and prediction engine 200 can infer what known causes are likely to be present in the world at that moment. The inferred beliefs can be used to make predictions or to generate behavior. Generally, learning (in the machine) occurs with time-varying inputs. Learning requires that causes persist while the sensory input changes.

By combining memory of likely sequences with current input, each node in the node hierarchy 300 has the ability to make predictions of what is likely to happen next. Series of predictions can be fed back into the knowledge extraction and prediction engine 200 enabling it to predict likely events that may happen in the future, for example, predicting dangerous situations before they occur or financial frauds as they are occurring.

The knowledge extraction and prediction engine 200 that has learned the causes in its world, and how those causes behave over time, has in essence created a model of its world. For example, the knowledge extraction and prediction engine 200 plugged into the business transaction system 130, which interacts with its world (e.g. a financial institution). As the knowledge extraction and prediction engine 200 discovers the causes in its world, it learns to represent its built-in behaviors just as it learns to represent the behaviors of objects in the outside world. From the knowledge extraction and prediction engine's 200 perspective, the system it is connected to is just another object in the world. When the knowledge extraction and prediction engine 200 predicts that a behavior will occur, it can make the behavior happen in advance. By stringing together sequences of these simple behaviors, it can create novel, complex, goal-oriented behaviors. To do this, the knowledge extraction and prediction engine 200 can perform the same steps it does when generating a string of predictions and imagining the future. However, now instead of just imagining the future, the knowledge extraction and prediction engine 200 strings together the built-in behaviors to make them actually happen.

As aforementioned, the knowledge extraction and prediction engine 200 can be structured as a hierarchy of nodes, where each node performs the same learning algorithm, which is to discover the causes of its input. Nodes at the bottom of the hierarchy receive input from a small area of the sensory input. Therefore, the causes they discover are ones that are relevant to a small part of the sensory input area. Higher up regions receive input from multiple nodes below, and again discover the causes in this input. These causes will be of intermediate complexity, occurring over larger areas of the entire input space.

The node or nodes at the top represent high-level causes that may appear anywhere in the entire sensory field. All these causes need to be discovered by the knowledge extraction and prediction engine 200. The causes do not need to be predetermined. The knowledge extraction and prediction engine 200 can rapidly resolve conflicting or ambiguous input as information flows up the hierarchy. Each node in the knowledge extraction and prediction engine 200 generally has a fixed number of causes and a fixed number of output variables. The knowledge extraction and prediction engine 200 can receive a fixed number of possible causes, and through training, it learns to assign meaning to them.

The nodes do not add causes as they are discovered, instead, over the course of training the meaning of the outputs can gradually change. This can happen at all levels in the hierarchy 300 simultaneously. A consequence of this learning methodology is that an untrained knowledge extraction and prediction engine cannot form very meaningful representations at the top of the hierarchy until nodes at the bottom of the hierarchy have undergone sufficient training. Messages flow up and down the hierarchy of nodes. As information passes up the hierarchy 300, each node tries to coalesce a series of input patterns into a relatively stable output pattern. By assigning causes to sequences of patterns, there is a natural coalescing of time as patterns move from the bottom of the hierarchy to the top. Fast changing low-level input patterns become slower changing as they rise to the top. As information flows down the hierarchy, each node takes a relatively stable pattern from its parent node and turns it into a sequence of spatial patterns. Relatively stable patterns at the top of the hierarchy can unfold into complex temporal patterns at the bottom of the hierarchy. Shared representations lead to generalization and storage efficiency, which can result in easier discovery and inference of causes and relationships using the hierarchy of nodes.

Causes in lower levels of the hierarchy are shared among higher-level causes, significantly reducing the amount of time and memory required to learn new causes, and providing the HTM a means to generalize previously learned behaviors to new and novel causes. Although an increase in memory efficiency can be gained by sharing representations in a hierarchy, the negative side of this constraint is that the system cannot easily learn to recognize new objects that are not made up of previously learned sub-objects. This limitation is rarely a problem because new objects in the world are generally formed by combinations of previously learned sub-objects. The hierarchy 300 matches the spatial and temporal real world hierarchy. The knowledge extraction and prediction engine 200 exploits this structure by first looking for nearby correlations in sensory data. As the hierarchy 300 is ascended, the knowledge extraction and prediction engine 200 continues this process, but now it is looking for correlations of nearby causes from the first level, then correlations of nearby causes from the second level.

Spatial hierarchy can be explained by the following example. A human body includes parts such as a head, a torso, arms, and legs. Each of these parts is composed of smaller parts. The head has hair, eyes, nose, mouth, and ears. Each of these is composed of yet smaller parts. An eye has lashes, pupil, iris, and an eyelid. At each level of the hierarchy, the sub-components are near each other in the input pattern arriving from lower levels in the hierarchy. Nodes at the bottom of the hierarchy 300 can also find temporal correlations among patterns that occur relatively close together in both space and time (e.g., pattern B immediately follows pattern A). Because each node of the hierarchy 300 can convert a sequence of spatial patterns into a constant value, the next level in the hierarchy looks for sequences of sequences. The world is hierarchical in a temporal sense, not just spatially. For example, language is a hierarchically structured temporal sequence. Simple sounds are combined into phonemes, phonemes are combined into words, and words are combined into phrases and ideas. Correlations are first found among nearest neighbors in both space and time. Each node in the hierarchy coalesces both time and space, and therefore, as information ascends the hierarchy 300, the representations cover larger areas of sensory space, and longer periods.

The knowledge extraction and prediction engine ensures all nodes quickly reach the best mutually compatible beliefs. The knowledge extraction and prediction engine 200 can use a variation of Belief Propagation (BP) used with Bayesian networks to make inferences. The sensory data imposes a set of beliefs at the lowest level in the hierarchy 300, and by the time the beliefs propagate to the top level node 350, each node in the hierarchy 300 represents a belief that is mutually consistent with all the other nodes. The top-level node 350 can show what highest level causes are most consistent with the inputs at the lowest levels. One advantage is that ambiguity gets resolved as beliefs ascend the hierarchy. Another advantage of hierarchical BP is that it is possible to make large systems that settle rapidly.

The time it takes for the knowledge extraction and prediction engine 200 to infer its input increases linearly with the number of levels in the hierarchy 300. However, the memory capacity of the knowledge extraction and prediction engine 200 increases exponentially with the number of levels. The knowledge extraction and prediction engine 200 networks can have, for example, millions of nodes, yet still have the longest path be short (e.g., five steps). The knowledge extraction and prediction engine 200 can handle time, self-training, and the discovery of causes. In some example embodiments, there could be three sources of dynamic change in the knowledge extraction and prediction engine 200. One can occur because of the changing sensory input. The second can occur as each node uses its memory of sequences to predict what will happen next and passes this prediction down the hierarchy.

The third can happen only during training and at a much slower time scale. As nodes of the hierarchy 300 learn, they can change the meaning of their outputs, which affects other nodes which have to learn to adjust their meanings as well. Whenever the state of the network changes, whether due to sensory changes or internal prediction, the network quickly settles on the set of beliefs that are most mutually consistent.

One of the tasks of every node in the knowledge extraction and prediction engine 200 is to assign causes to recurring temporal sequences of spatial patterns in its input. To achieve this, a node can learn a fixed number of the most common spatial patterns and create a "probability vector" which can show how close the current set of inputs is to each of these patterns.

For example, a node can have a hundred of inputs and two of those inputs, i1 and i2, become active at the same time. If this happens often enough the knowledge extraction and prediction engine 200 can assume that i1 and i2 share a common cause.

The sensor 320 can be inserted into various parts of the domain of interest 120 to gather the current data, which will be received as the unknown patterns 122. A trained network can then, for example, provide an early warning of system failures and predict system degradations and outages. The spatial pooler 240 can use a Euclidean distance metric to compare the unknown spatial patters to the quantization points representing reference spatial objection within the quantization center of each node. Similarly the temporal pooler 250 can use a Euclidean distance metric to compare the unknown temporal patters to the reference temporal patterns learned during the during the training phase by the knowledge extraction and prediction engine 200. The effector 360 can effect a change in the domain of interest 120 based on the cause recognition.

Figure 4:
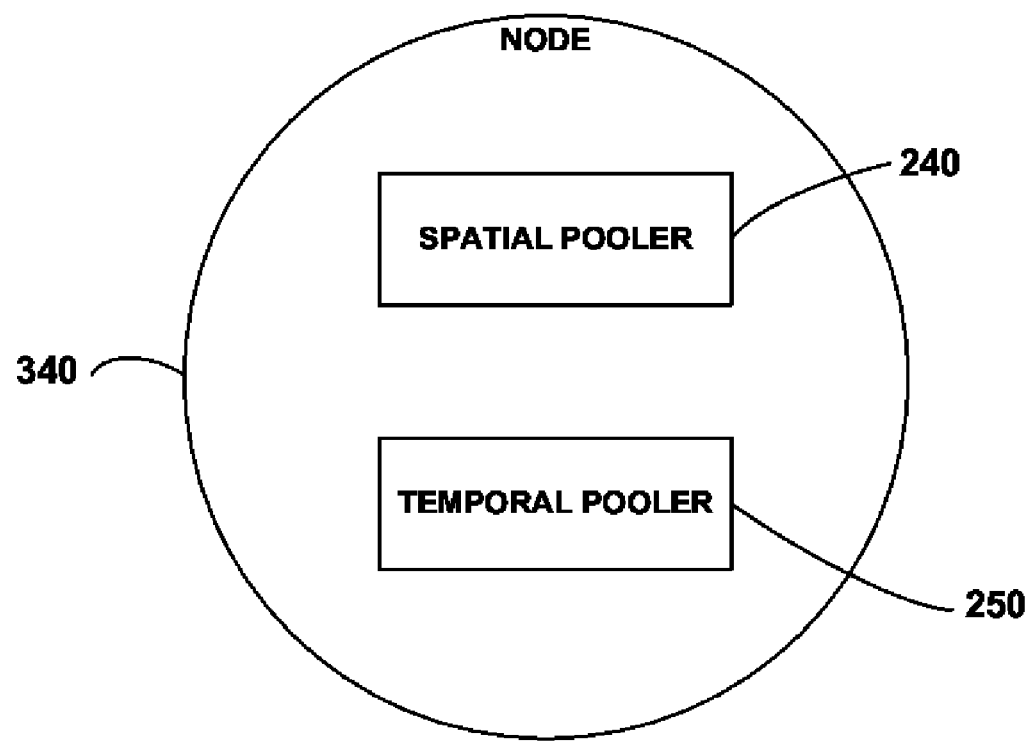
FIG. 4 is a schematic diagram of a node according to an example embodiment.

FIG. 4 illustrates a schematic diagram of a node 340 according to an example embodiment. The node 340 can include the spatial pooler 240 and the reference temporal pooler 250.

Normally the input patterns seen by a node looking at real world data will be larger, messier, and will almost never repeat. In addition, the inputs are generally graded probabilities, not binary. Therefore, the node has to be able to decide what the most common spatial patterns are without ever seeing any particular pattern twice and without seeing clean patterns. During the training phase, the spatial pooler 240 can collect unique instances of patterns (e.g., pictures) and determine that that the pictures represent five different objects (other number can be specified). For example, a node can be aware that it needs to group all images to represent five hundred different objects. Once the five hundred limit is reached the spatial pooler 240 can stop collecting and start sending a probability vector up the hierarchy 300. The probability vector can indicate that according to the distance calculations, there is a 35% possibility of the object being C1 and 45% possibility of the object being C2.

Thus, based on the quantization points, the unknown spatial objects are pooled together in the spatial pooler 240. A node has to determine the most common sequences of spatial patterns by looking at distributions of spatial patterns, as it will never see clean data. Therefore, it is not practical to simply enumerate and count spatial and temporal patterns. Probabilistic techniques must be used. For most causes in the world, it is not clear when a sequence begins or ends, and there is possible branching at many elements. To form sequences, the node has to know when new spatial patterns arrive (i.e. decide when the change in the input pattern is sufficient to mark it as a new event).

Thereafter, the temporal pooler 240 can start grouping spatial groups pooled by the spatial pooler 240 into temporal patterns according to the order they were sensed. Thus, groups of objects that are not necessarily spatially closed can be grouped together by the temporal pooler 240 in temporal sequences. The number of such temporal sequences within each node can be predetermined. When the quantization points and reference temporal objects are determined, the training can be turned off and the inference mode is then activated.

For example, the node 340 can store fifty of the most common spatial patterns as quantization points. When a novel input pattern arrives, the node 340 can determine how close the new pattern is to the previously learned fifty patterns and assigns probabilities that the new pattern matches each of the fifty known patterns. Next, the temporal pooler 250, which has learned, for example, a hundred most common temporal sequences of the fifty most common spatial patterns can assign probabilities to the temporal patterns of the unknown groups of spatial objects. For example, a melody is a sequence of spatial patterns where each pattern is marked by the onset of a new note. Some sensory patterns are like melodies, but many are not.

Figure 5:
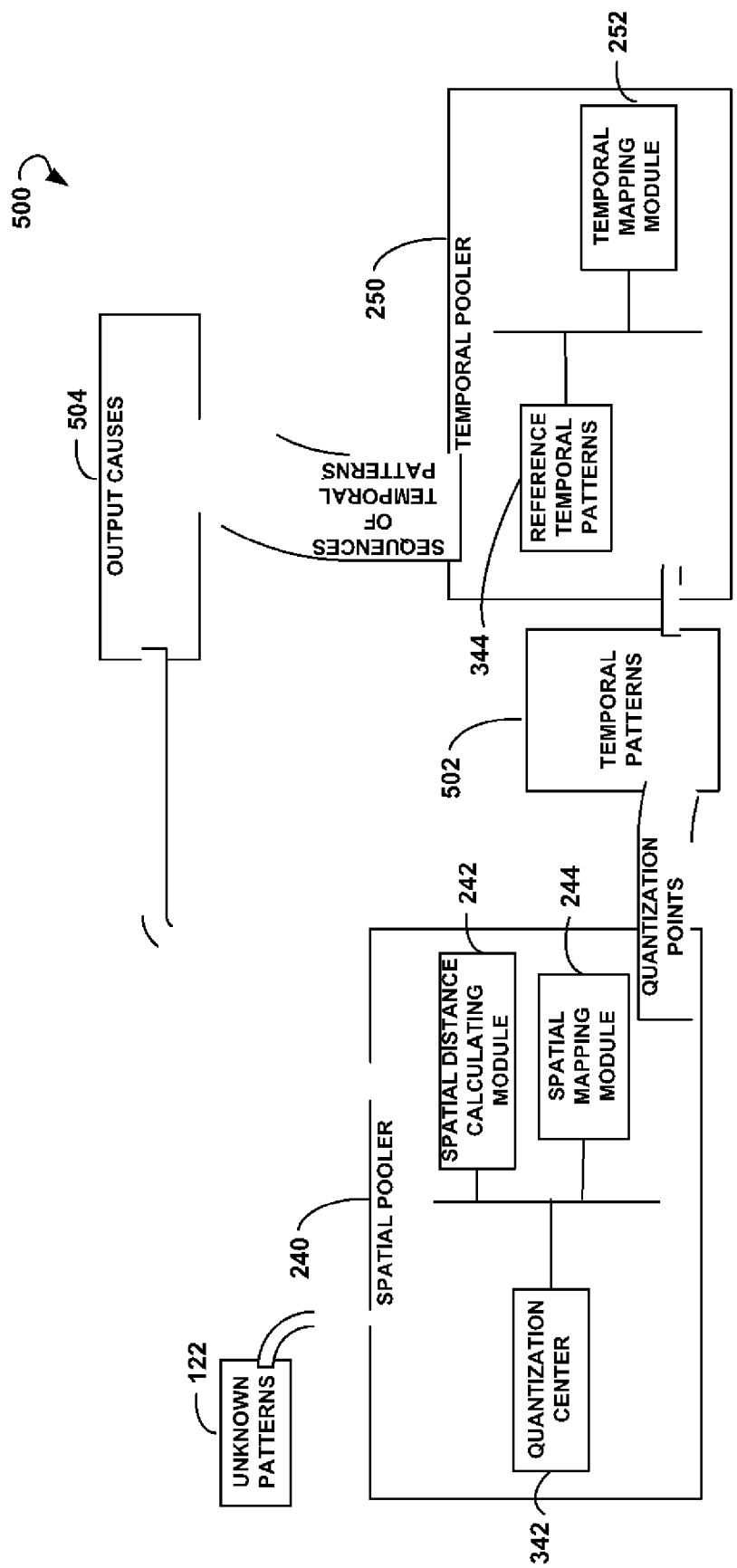
FIG. 5 is a schematic diagram of a system according to an example embodiment.

FIG. 5 illustrates a schematic diagram of a system 500 according to an example embodiment. The system 500 includes the unknown patterns 122, the spatial pooler 240, temporal patterns 502, the temporal pooler 250, and output causes 504. The spatial pooler 240 can include the quantization center 342, a spatial distance-calculating module 242, and a spatial mapping module 244.

Pattern recognition can entail assigning unknown input patterns to one of a number of categories. The spatial pooler 240 can be utilized to assign a label to multiple patterns and putting them in the same pool. There are two pooling mechanisms used by a node. Spatial quantization is based on spatial similarity. The node can take an unknown pattern and determines how close it is to each quantization point (current set of learned spatial patterns). The spatial distance-calculating module 242 can automatically calculate Euclidean distances to determine how close they are to each other spatially. Based on the distances calculated by the spatial distance-calculating module 242, the spatial mapping module 244 can map a plurality of unknown patterns to the quantization points.

The temporal patterns 502 can be represented by sequences of groups of unknown spatial patterns. The temporal pooler 250 can include reference temporal patterns 344 and a temporal mapping module 252.

No single node in the hierarchy 300 can remember the entire sequence of objects. Nodes at the bottom of the hierarchy 300 can learn sequences that are short and dictated by the small area of the input pattern they can see. Nodes at the next level are more stable. They learn sequences of the sequences at the bottom level. Stability can increase as patterns ascend the hierarchy 300. With sufficient training, the output of the highest level in the hierarchy 300 can remain stable for the duration of the input sequence.

For example, the outside of a watermelon does not look like the inside of a watermelon. Yet an observer seeing both images would identify both as a watermelon. There is no significant "spatial" overlap between the two images or even parts of the images, so it is in a sense an "arbitrary" mapping. By having learned temporal patterns of objects, the observer can tell both images belong to one spatial object, the watermelon.

Figure 6:
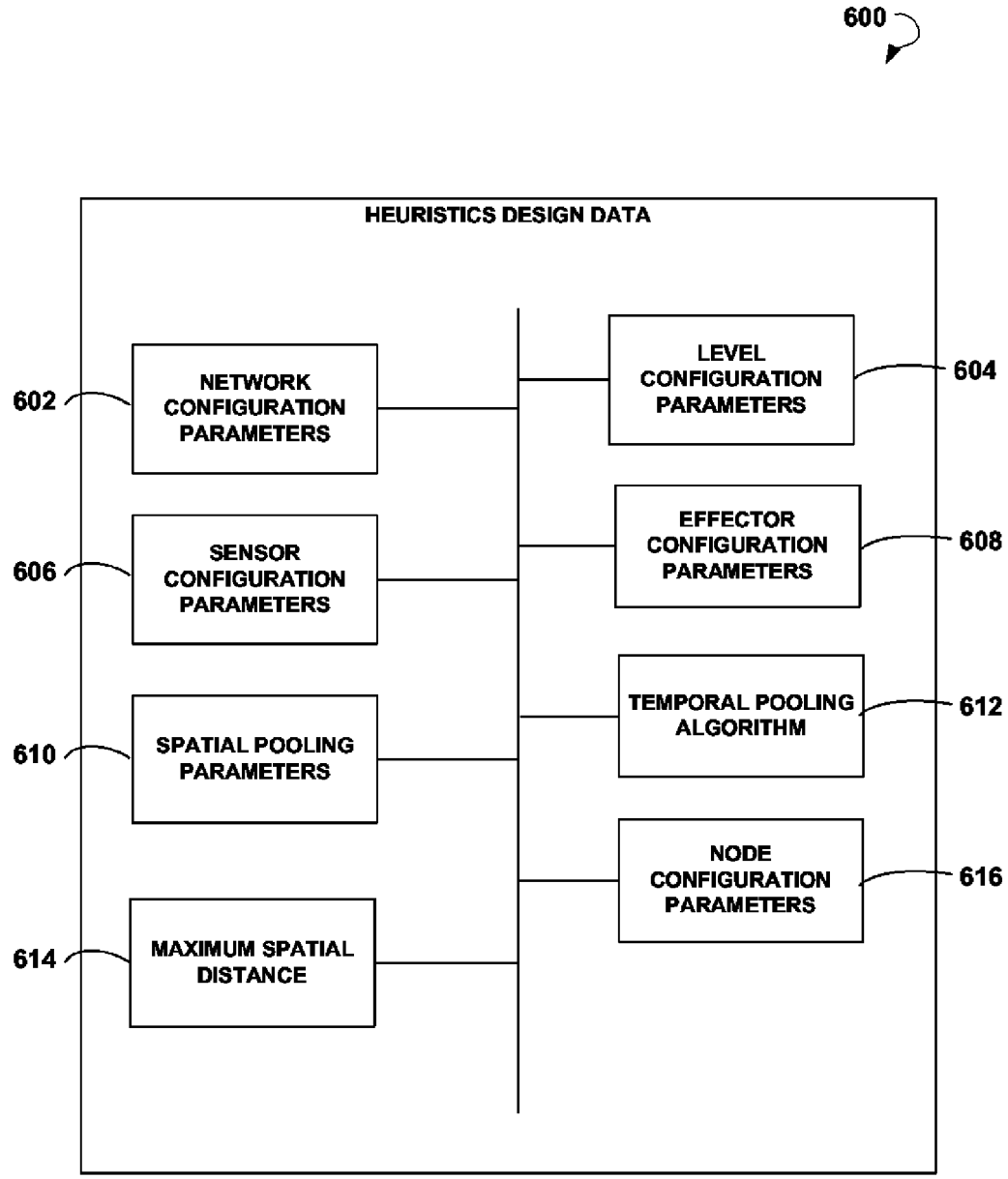
FIG. 6 is a schematic diagram of a system according to an example embodiment.

FIG. 6 illustrates the heuristic design data 600 according to an example embodiment. The heuristic design data 600 can include network configuration parameters 602, level configuration parameters 604, sensor configuration parameters 606, effector configuration parameters 608, spatial pooling parameters 610, temporal pooling algorithm 612, a maximum spatial distance 614, and node configuration parameters 616.

The heuristic design data 600 can be provided in one or more configuration files. The configuration parameters can configure how many quantization centers each node is to include, how many probability vectors should be sent up the hierarchy 300, how many nodes and layers, and what algorithms are to be utilized. A configuration file can be used to build the whole network and another configuration file can be used to train the network.

When designing the knowledge extraction and prediction engine 200 for a particular problem, it is important to determine whether the problem space (and the corresponding sensory data) has hierarchical structure. For example, if the knowledge extraction and prediction engine 200 is desired to understand financial markets, data can be presented to the knowledge extraction and prediction engine 200 where adjacent sensory input data are likely to be correlated in space and time.

For example, stocks can be grouped by price category, and then by industry segment. Technology stocks such as semiconductors, communications, and biotechnology can be grouped together in the first level. At the next level, the technology group is combined with manufacturing, financial, and other groups. A similar hierarchy can be built for bonds, and then at the top, stocks can be combined with bonds.

For example, the knowledge extraction and prediction engine 200 can be build to model a manufacturing business. At the bottom of the hierarchy might be nodes that receive as inputs various manufacturing metrics. Another set of nodes at the bottom might receive as inputs marketing and sales metrics, and yet another set of low-level nodes might receive as inputs financial metrics. The knowledge extraction and prediction engine 200 can be more likely to find correlations among various manufacturing metrics than between the cost of advertising and the yield of a manufacturing line. However, higher up in the hierarchy, nodes can learn to represent causes global to the business, spanning manufacturing and marketing. The design of the knowledge extraction and prediction engine's 200 hierarchy should reflect the likely correlations in its world.

Designers of the knowledge extraction and prediction engine 200 can spend time experimenting with different hierarchies and sensory data arrangements trying to optimize both the performance of the system and its ability to find high-level causes.

The network configuration parameters 602 can be used to set the algorithm that determines when a node automatically switches itself from training mode to inference mode. The network configuration parameters 602 can be implemented to switch when the frequency of novel coincidences falls below a predetermined threshold. This algorithm can also be useful in optimizing one's network configuration when used to calculate "fitness values" in genetic programming. The network configuration parameters 602 can define the number of elements in the output vector of each node of the network. The network configuration parameters 602 can define the minimum and maximum number of network levels.

Figure 7:
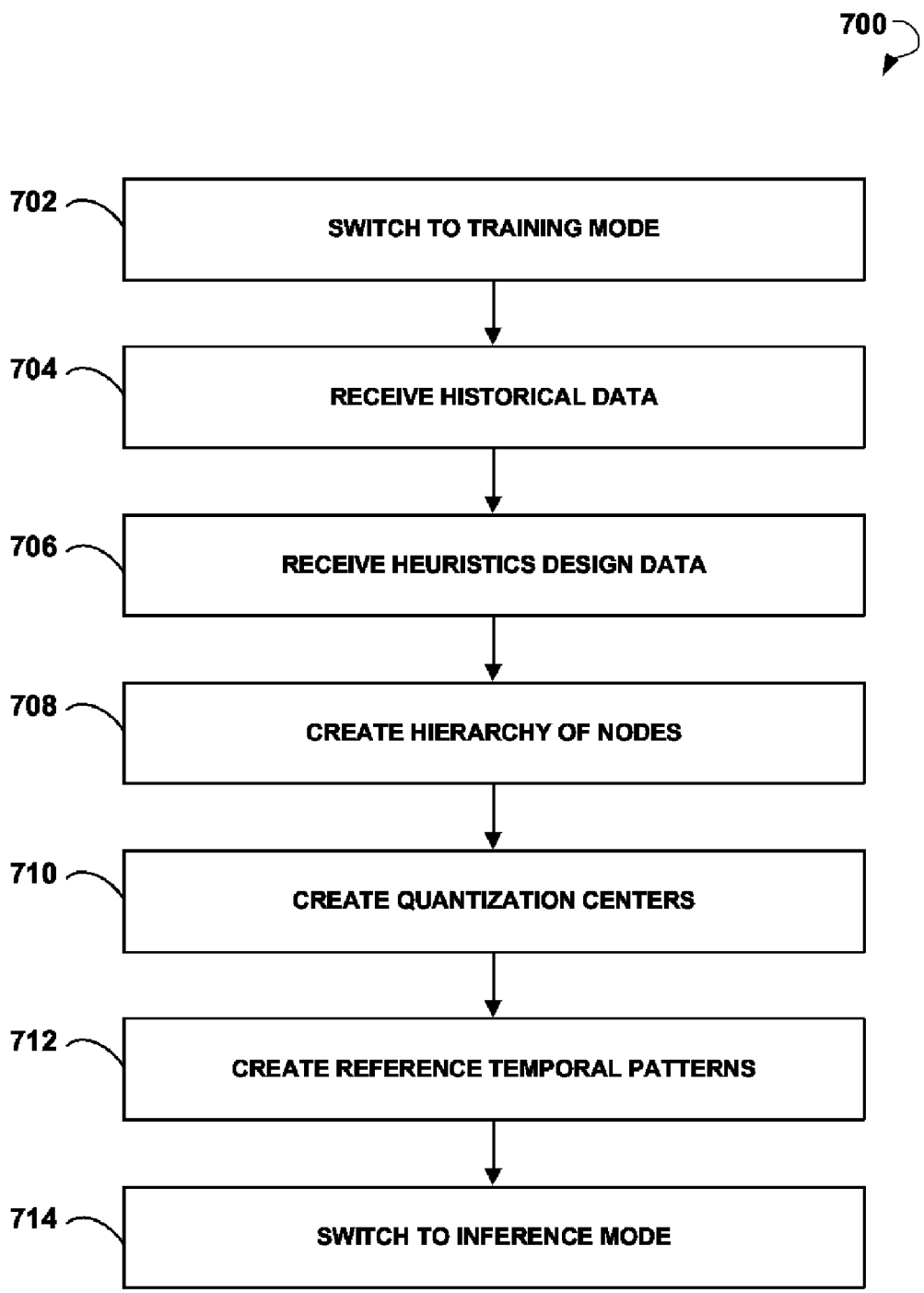
FIG. 7 is a is a flow chart of a method according to an example embodiment.

FIG. 7 is a flow chart of a method 700 according to an example embodiment. The method 700 can commence at 702 with the knowledge extraction and prediction module 200 switching to the training mode. In some example embodiments, with the knowledge extraction and prediction module 200 does not switch to the training mode because it can operate in both training and inferring modes simultaneously. At 704, the communication module 210 can receive historical data pertaining to a domain of interest. The knowledge extraction and prediction module 200 can automatically extract and apply knowledge to this historical data. Training of a single node is accomplished by process steps 706, 708, 710, 712, and 714. These steps are repeated to train each untrained node in an example. Each lower level node that feeds to an upper level node is trained before the respective upper level node is trained.

In an example, the training process can begin at step 706. At 706, the communication module 210 can receive predetermined heuristics design data associated with the domain of interest. At 708, the causal map 220 can automatically create the hierarchy of nodes 300 based on the predetermined heuristics design and historical data. In an example, the network creation tool can automatically create the hierarchy of nodes based on the design data. Historical data is received from which the knowledge extraction and prediction module 200 automatically extract knowledge.

Determining the optimal network configuration can be an art with few heuristics. Typical decisions can include the number of levels in your hierarchy, the number of nodes at each level, the algorithms to use for each specific node, and the optimal parameters for each algorithm and/or node. A learning termination strategy can be implemented that enhances the automation of network training by enabling nodes to determine when to switch from training to inference mode without human intervention. The nature of this design pattern can also make it a candidate to calculate fitness values for network configurations using genetic algorithms. The network configuration(s) with the least number of time steps required to train your network (or nodes on average) given the same set of training data are likely "optimal" for the domain of interest. Finally, although the learning termination strategy can be based on the frequency of new incoming patterns dropping below a specific threshold, as an implementation of the strategy design pattern, and many different algorithms may be used interchangeably.

At operation 710, the spatial pooler 240 can automatically create quantization centers representing patterns of spatial input. At 712, the temporal pooler 250 can create sequences of spatial patterns (i.e. temporal patterns). At 714, the knowledge extraction and prediction module 200 can switch to inference mode based on the learning termination strategy mentioned above In some example embodiments supervised training can be utilized because there could be situations in which the knowledge extraction and prediction module 200 cannot always learn desired causes by sensing sequences of input patterns. Sensory data may not be sequenced properly to allow the temporal pooler 250 to determine the correct association. It may not be possible for knowledge extraction and prediction module 200 to learn on its own, using spatial and temporal pooling, that apples and oranges are to be grouped in the same category of fruits).

The learning process can be supervised by imposing a prior expectation on the top-level node 350 in the hierarchy 300 during learning. As each top-level node receives its input from the lower levels, it also receives the corresponding category input 352 via the category sensor 354. If, for example, the knowledge extraction and prediction module 200 is being used to improve safety in a car by looking at nearby traffic, it might make sense to supervise the training on what are dangerous situations and what are not, as opposed to letting it discover these on its own. If we have the knowledge extraction and prediction module 200 that is trying to discover high-level causes of stock market fluctuations, there is no need to impose our prior beliefs on the system. At 712 the quantization center 342 can create sequences of spatial patterns, and at 714, the knowledge extraction and prediction module 200 can switch to the inference mode.

Figure 8:
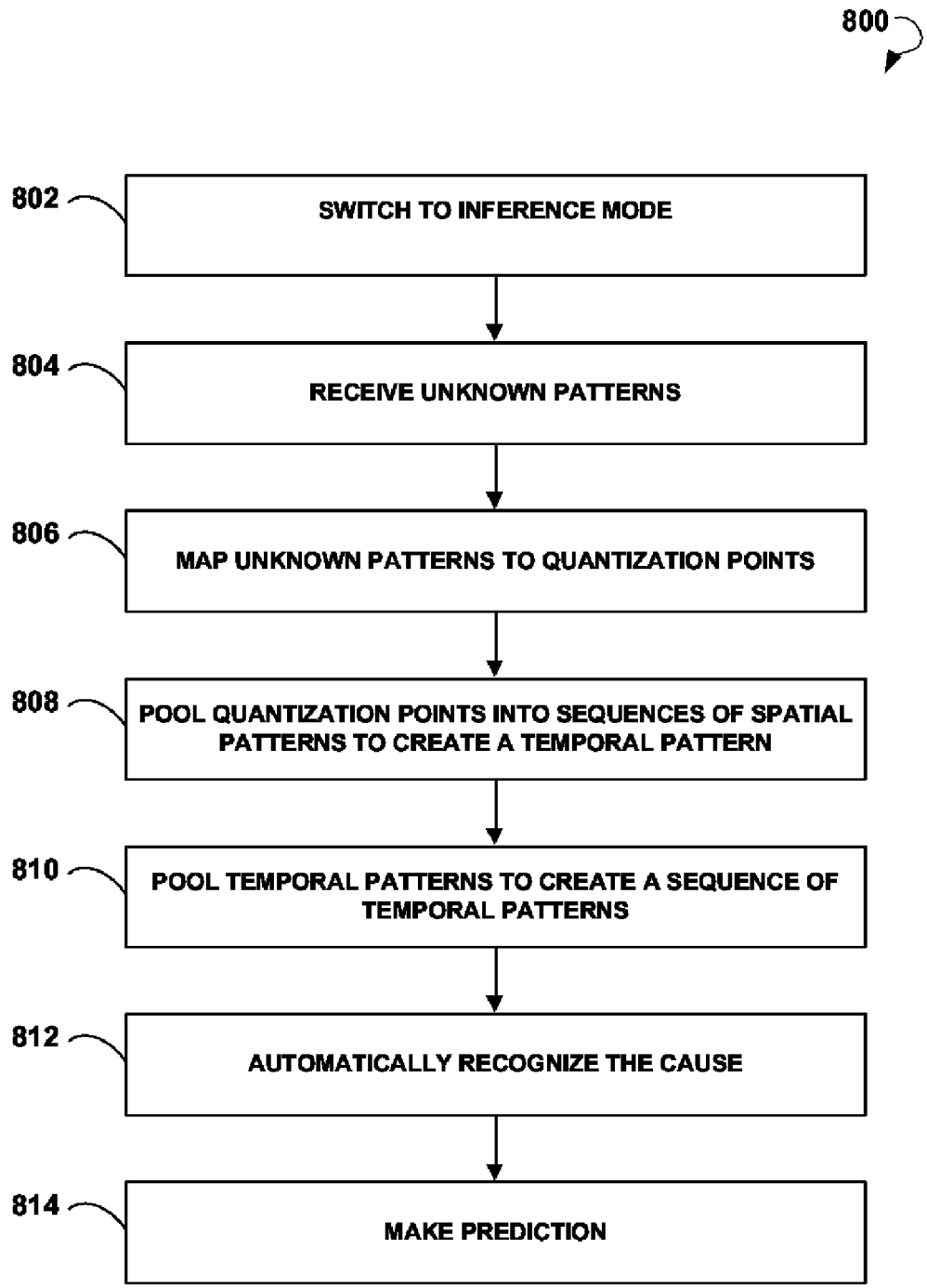
FIG. 8 is a is a flow chart of a method according to an example embodiment.

FIG. 8 is a flow chart of a method 800 according to an example embodiment. The method 800 may commence at 802 with the knowledge extraction and prediction module 200 switching to the inference mode. In an example, once the network has been trained and the nodes have been switched to the inference mode, only the top node 350 may be switched back to the training mode and enhanced with additional training data. During network training, each node switches from training to inference mode starting from the bottom of the hierarchy up to the top node; at which point the network is considered trained. As each node switches modes however, transitional data structures are abandoned. Therefore, to enable a "trained", in-production, network to be further trained at some later point in time, all training-related data structures must be saved at the point of mode switch to the inference mode. Moreover, since the knowledge extraction and prediction module 200 learns "building block" patterns at, or near the bottom of the hierarchy, training enhancements should (or can) generally occur near the middle or upper part of the hierarchy. All nodes at the same level and above must be switched back to the training mode. New training data is then fed into the sensors until each node has automatically switched itself back to the inference mode indicating the network is ready to be tested and put back into production.

Now that the knowledge extraction and prediction engine 200 is in inference mode, it can start receiving the unknown patterns at 804 and propagating them up in the hierarchy 300. A plurality of unknown patterns pertaining to the cause associated with the domain of interest can be received via data sensors. Once the data is received, the knowledge extraction and prediction engine 200 can model causal relationships in that data. For example, if the knowledge extraction and prediction engine 200 determines that data related to the financial transactions from bank 1, bank 2, and bank 3 then it can recognize the patterns related to those transactions. User A can engage in the same transaction eight times at the same time that user B engages in a different transaction. The knowledge extraction and prediction engine 200 can try to recognize that when user A has a transaction for $28,000 on Monday it is an anomaly indicating a potential fraud because he usually does transactions for $5 or $6 on Tuesdays, Thursdays, and Fridays.

At 806, the reference temporal patterns 344 can be utilized to map unknown patterns to the quantization patterns stored at the quantization centers of the nodes. The causes can be associated because they follow each other in time. Each node can recognize the causes and their associations. For example, in an identification (ID) theft situation, causes can include opening an account, pulling a credit record, and applying for a loan. These causes can indicate an ID theft to some degree of likelihood.

At 808, the reference temporal patterns 344 can be pooled together into sequences of spatial patterns to create a temporal pattern. At 810, the temporal mapping module 252 can pool the temporal patterns to create a sequence of temporal patterns. The knowledge extraction and prediction engine 200 can automatically pool the quantization points into a temporal pattern, the temporal pattern being a sequence of spatial patterns that represent the cause. Because of the hierarchical structure, the patterns continually compose themselves such that by the time we reach the top, they have transformed into stable-long-duration trends. At 812, the knowledge extraction and prediction module 200 can automatically recognize the cause based on the sequence of temporal patterns. In some example embodiments, creating the causal maps and recognizing the cause occur substantially simultaneously. At 814, statistically relevant immediate and trending predictions can be made based on the learned causal map. By making predictions, the knowledge extraction and prediction module 200 can plan and direct behavior, for example, by fixing the system bug that is about to happen.

Figure 9:
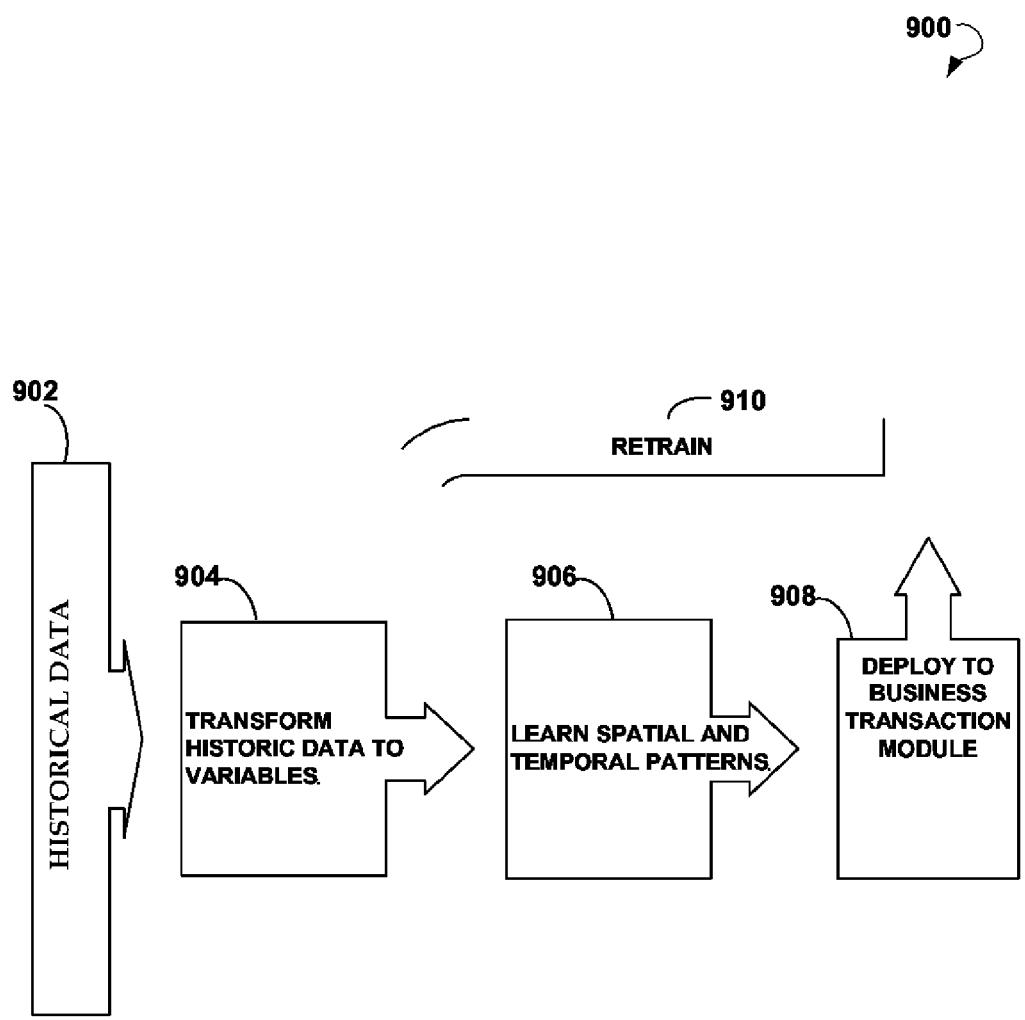
FIG. 9 is a flow chart of a method according to an example embodiment.

FIG. 9 is a flow chart of a method 900 according to an example embodiment. The method 900 may commence at 902 with the communication module 210 receiving the historical data from the domain of interest via sensors.

At 904, the historical data can be transformed into variables and at 906, the knowledge extraction and prediction engine 200 can learn spatial and temporal patterns based on the historical data. At operation 908, the knowledge extraction and prediction engine 200 can be deployed to the business transaction system 130, and at 910, the knowledge extraction and prediction engine 200 can be further trained by using the data containing patterns not contained in its original training data. Hence, the knowledge extraction and prediction engine 200 train itself while operating in real-time, sensed data. This can be accomplished by providing it with data that has causes that stay same while temporal data changes. The knowledge extraction and prediction module 200 can learn these causes in different variations and eventually learn invariant representations of the causes; by building sequences that represent all those causes it can build new and/or modified causal maps.

The knowledge extraction and prediction engine 200 can be entirely agnostic to the environment of the data it has been provided. Its only concern is that the data is organized in such a manner that adjacent sensory input data are likely to be correlated in space and time.

Figure 10:
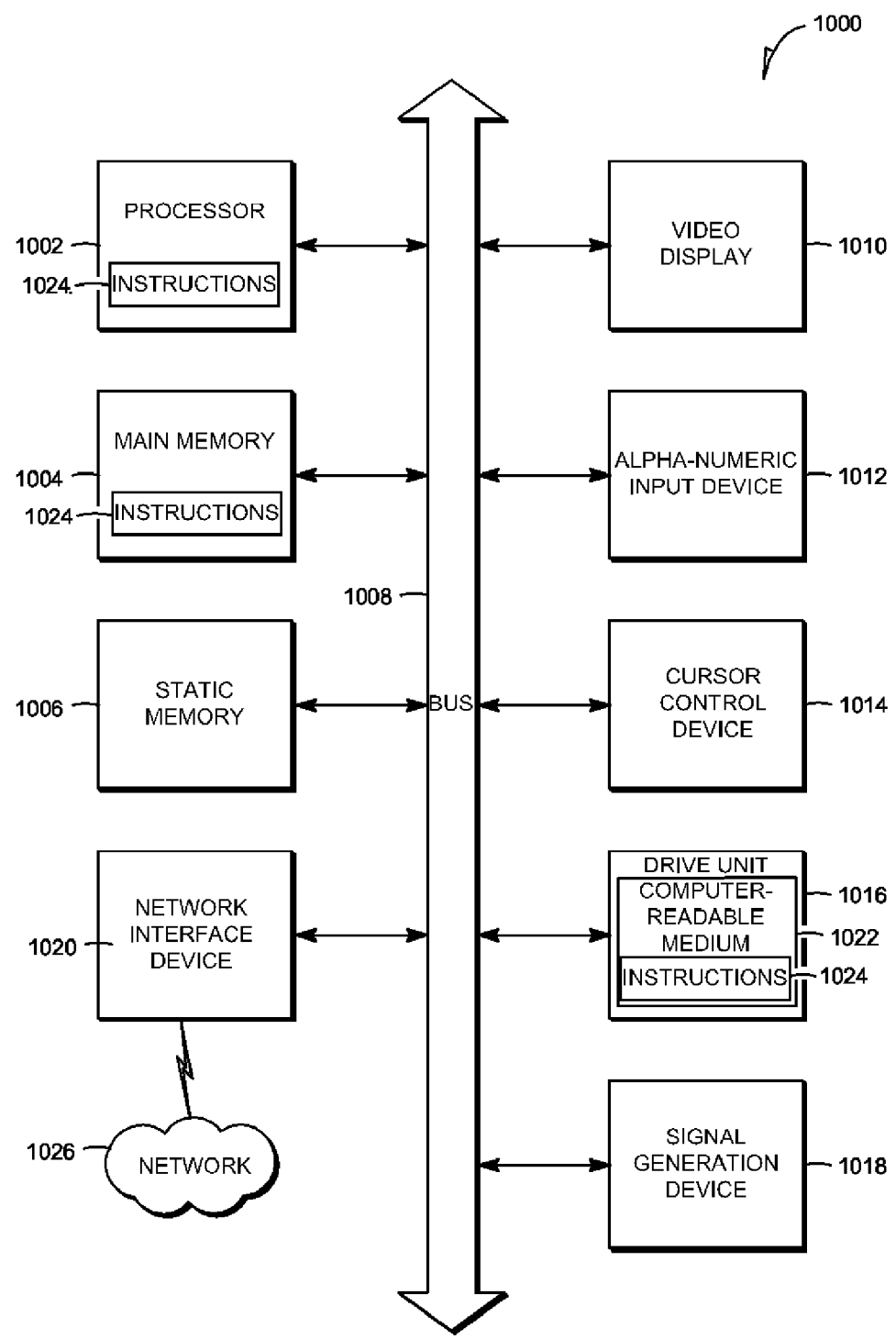
FIG. 10 is a schematic view of a subsystem according to an example embodiment.

FIG. 10 shows a diagrammatic representation of machine in the example form of a computer system 1000 within which a set of instructions may be executed causing the machine to perform any one or more of the methods, processes, operations, applications, or methodologies discussed herein. The computing systems can include at least one of the computer system 1000.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU) a graphics processing unit (GPU) or both), a main memory 1004 and a static memory 1006, which communicate with each other via a bus 1010. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a drive unit 1016, a signal generation device 1018 (e.g., a speaker) and a network interface device 1020.

The drive unit 1016 includes a machine-readable medium 1022 on which is stored one or more sets of instructions (e.g., software 1024) embodying any one or more of the methodologies or functions described herein. The software 1024 may also reside, completely or at least partially, within the main memory 1004 and/or within the processor 1002 during execution thereof by the computer system 1000, the main memory 1004 and the processor 1002 constituting machine-readable media. The software 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies shown in the various embodiments of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules (e.g., engines) can be implemented as hardware circuitry, optical components, single or multi-processor circuits, memory circuits, software program modules and objects, firmware, and combinations thereof, as appropriate for particular implementations of various embodiments.

An example of a mobile device for use with the methods and systems described herein is self-powered wireless device capable of a wide-area or local wireless communication with a plurality of other of hand-held, mobile, self-powered wireless devices or with base stations that are at a fixed location. The hand-held, mobile, self-powered wireless device can contain a memory, a human input device, a display, and an imaging device. The memory stores a plurality of data relating to an application data, and other data. Hand-held as used in the present disclosure can be devices small enough to be held in a human's hand. Wireless network as used in the present disclosure can be a wireless network capable of transmitting data over thousands of feet, for example, a wireless telephone network or wireless computer network or a peer-to-peer network. Self-powered as used in the present disclosure describes a device that will have self-contained power available wherever the user wants to take the device away from a base or stationary source of power. In one example, self-powered devices can be powered by a rechargeable battery, e.g., a lithium-ion battery. In an example, a fuel cell can be the mobile, self-power source. In another example, a mobile device is not fixed-location equipment such as desktop personal computer.

Aspects of the embodiments are operational with numerous other general purpose or special purpose computing environments or configurations can be used for a computing system. Examples of well known computing systems, environments, and/or configurations that may be suitable for use with the embodiments include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the embodiments may be implemented in the general context of computer-executable instructions, such as program modules, being executed by a computer. Generally, program modules include routines, programs, objects, components, data structures, etc. that perform particular tasks or implement particular abstract data types. Aspects of the embodiments may also be practiced in distributed computing environments where tasks are performed by remote processing devices that are linked through a communications network. In a distributed computing environment, program modules may be located in both local and remote computer storage media including memory storage devices.

Thus, methods and systems for knowledge extraction and prediction have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
a processor operable to execute:
at least one subsystem to receive historical data pertaining to a domain of interest;
at least one subsystem to receive predetermined heuristics design data associated with the domain of interest;
at least one subsystem to automatically create causal maps including a hierarchy of nodes, each node of the hierarchy of nodes being associated with a plurality of quantization points and reference temporal patterns, the plurality quantization points being known reference spatial patterns using the predetermined heuristics design and historical data;
at least one subsystem to receive, at each node, a plurality of unknown patterns pertaining to a cause associated with the domain of interest;
at least one subsystem to automatically map the plurality of unknown patterns to the quantization points using spatial similarities of the unknown patterns and the quantization points;
at least one subsystem to automatically pool the quantization points into a temporal pattern, the temporal pattern being a sequence of spatial patterns that represent the cause;
at least one subsystem to automatically map the temporal pattern to a reference temporal pattern;
at least one subsystem to automatically create a sequence of the temporal patterns; and
at least one subsystem to automatically recognize the cause based on the sequence of temporal patterns.

2. The system of claim 1, wherein the at least one subsystem to receive, at each node, the plurality of unknown patterns is to automatically receive the plurality of unknown patterns pertaining to the cause associated with the domain of interest.

3. The system of claim 1, further comprising at least one subsystem to automatically make a trend prediction using the sequence of temporal patterns.

4. The system of claim 1, further comprising at least one subsystem to automatically effect a change in the domain of interest using the cause recognition.

5. The system of claim 1, wherein at least one subsystem is to automatically optimize the predetermined heuristics data using evolutionary algorithms.

6. The system of claim 1, wherein at least one subsystem is to automatically arrange the causal maps according to a bureaucracy design pattern.

7. The system of claim 1, further comprising at least one subsystem to automatically calculate Euclidean distances to determine how close unknown patterns are to the quantization points and to mapping the temporal pattern to the reference temporal patterns.

8. A non-transitory computer-readable medium storing instructions that when executed by a computer perform the following steps:
computing, in a computing machine, causal maps from historical data pertaining to a domain of interest and predetermined heuristics design data associated with the domain of interest, the causal maps including a hierarchy of nodes;
associating each node of the hierarchy of nodes with a plurality of quantization points and reference temporal patterns, the plurality quantization points being known reference spatial patterns;
receiving, at each node, a plurality of unknown patterns pertaining to a cause associated with the domain of interest; and
mapping, in a computing machine, the plurality of unknown patterns to the quantization points using spatial similarities of the unknown patterns and the quantization points.

9. The medium of claim 8, further comprising instructions to pool, in a computing machine, the quantization points into a temporal pattern, the temporal pattern being a sequence of spatial patterns that represent the cause.

10. The medium of claim 9, further comprising instructions to map, in a computing machine, the temporal pattern to at least one reference temporal pattern.

11. The medium of claim 8, further comprising instructions to create, in a computing machine, a sequence of the temporal patterns.

12. The medium of claim 11, further comprising instructions to recognize, in a computing machine, the cause using the sequence of temporal patterns.

13. A computing system, comprising:
- a selector to select a domain of interest in a computing machine;
- a first receiver to receive historical data pertaining to the domain of interest;
- an optimizer to optimize heuristics design data using evolutionary algorithms to produce predetermined heuristics design data;
- a processor to associate the predetermined heuristics design data with the domain of interest;
- a second receiver to receive the predetermined heuristics design data associated with the domain of interest;
- a processor to use the predetermined heuristics design and historical data to automatically create causal maps and to automatically arrange the causal maps according to a bureaucracy design pattern, the causal maps including a hierarchy of nodes, each node of the hierarchy of nodes being associated with a plurality of quantization points and reference temporal patterns, the plurality quantization points being reference spatial patterns.

14. The system of claim 13, wherein the processor to use the predetermined heuristics design and historical data is to further substantially simultaneously recognize a cause when creating the causal maps.

15. The system of claim 13, wherein the processor to use the predetermined heuristics design and historical data is to further calculate Euclidean distances to determine how close reference points are to each other spatially.

16. The system of claim 15, wherein the processor to use the predetermined heuristics design and historical data is to further use the distances to indicate relative causal relationships.

17. The system of claim 13, wherein the processor to use the predetermined heuristics design and historical data is to further use nodes that include a plurality of inputs and an output, wherein the output includes fewer variables than the plurality of inputs.

18. The system of claim 13, wherein the processor to use the predetermined heuristics design and historical data is to further feed an output of at least one node back into a lower level node in the hierarchy of nodes.

19. A non-transitory computer-readable medium storing instructions that when executed by a computer perform the following steps:
- receiving historical financial data pertaining to a financial domain of interest;
- receiving predetermined heuristics design data associated with the financial domain of interest; and
- using the predetermined heuristics design and historical financial data, automatically creating causal maps including a hierarchy of nodes including at least one million nodes and less than 10 levels, each node of the hierarchy of nodes being associated with a plurality of quantization points and reference temporal patterns, the plurality quantization points being known reference spatial patterns.

20. The medium of claim 19, further comprising instructions to receive credit transactions.

21. The medium of claim 20, further comprising instructions to apply current credit card transactions to the hierarchy of nodes to determine fraud.

22. The medium of claim 21, further comprising instructions to input data into the hierarchy of nodes, wherein the data is at least one of transaction amount, system logging data, network system data, data related to a person's current holdings, status of those holdings, location of holdings, and physical location of electronic device used by the member.

23. The medium of claim 19, further comprising instructions to apply identification (ID) theft data to inputs of the hierarchy of nodes.

24. The medium of claim 23, further comprising instructions to apply account opening data, pulling credit record data, and applying for a loan data.

25. A non-transitory computer-readable medium storing instructions that when executed by a computer perform the following steps:
- receiving historical data pertaining to a domain of interest;
- receiving predetermined heuristics design data associated with the domain of interest;
- using the predetermined heuristics design and historical data, automatically creating causal maps including a hierarchy of nodes, each node of the hierarchy of nodes being associated with a plurality of quantization points and reference temporal patterns, the plurality quantization points being known reference spatial patterns; and
- receiving, at each node, signals from data sensors that produce a plurality of unknown patterns pertaining to a cause associated with the domain of interest; and
- mapping the plurality of unknown patterns to the quantization points using spatial similarities of the unknown patterns and the quantization points.

26. The medium of claim 25, further comprising instructions to pool the quantization points into a temporal pattern, the temporal pattern being a sequence of spatial patterns that represent the cause.

27. The medium of claim 26, further comprising instructions to map the temporal pattern to at least one reference temporal pattern.

28. The method of claim 25, further comprising instructions to create a sequence of the temporal patterns.

29. The medium of claim 28, further comprising instructions to recognize the cause using the sequence of temporal patterns.

* * * * *